US012670201B2

(12) United States Patent
Ledley et al.

(10) Patent No.: US 12,670,201 B2
(45) Date of Patent: *Jun. 30, 2026

(54) DOCUMENTATION RECORD RETRIEVAL AND TRANSACTION MATCHING

(71) Applicant: Ramp Business Corporation, New York, NY (US)

(72) Inventors: Harry Ledley, New York, NY (US); Stephen Snow, New York, NY (US)

(73) Assignee: Ramp Business Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,152

(22) Filed: Dec. 3, 2024

(65) Prior Publication Data

US 2025/0094476 A1 Mar. 20, 2025

Related U.S. Application Data

(63) Continuation of application No. 18/116,828, filed on Mar. 2, 2023, now Pat. No. 12,174,870.

(60) Provisional application No. 63/483,973, filed on Feb. 9, 2023.

(51) Int. Cl.
*G06F 16/35* (2025.01)
*G06F 16/38* (2019.01)

(52) U.S. Cl.
CPC .............. *G06F 16/35* (2019.01); *G06F 16/38* (2019.01)

(58) Field of Classification Search
CPC .................................. G06F 16/35; G06F 16/38
See application file for complete search history.

(56) References Cited

U.S. PATENT DOCUMENTS

| | | | |
|---|---|---|---|
| 11,188,981 B1 | 11/2021 | Shiu et al. | |
| 2018/0096435 A1* | 4/2018 | Guzman | G06Q 40/123 |
| 2019/0364426 A1* | 11/2019 | Muthukrishnan .. | G06Q 20/3674 |
| 2020/0050621 A1* | 2/2020 | Malon | G06F 16/93 |
| 2020/0169412 A1 | 5/2020 | Certain et al. | |
| 2020/0342394 A1 | 10/2020 | Moore et al. | |
| 2020/0380455 A1* | 12/2020 | Joy | G06Q 10/087 |
| 2021/0056562 A1 | 2/2021 | Hart et al. | |
| 2022/0366022 A1* | 11/2022 | Goldston | G06F 16/61 |
| 2023/0153811 A1 | 5/2023 | Li et al. | |

* cited by examiner

*Primary Examiner* — Dangelino N Gortayo
(74) *Attorney, Agent, or Firm* — Fenwick & West LLP

(57) ABSTRACT

A system for automated matching between a transaction and a documentation record on behalf of an organization client. The computing server receives, from a third-party server, communication payloads including a documentation record (e.g., a receipt) automatically generated by a third-party named entity acknowledging an occurrence of a particular real-time transaction. The computing server extracts attributes from the documentation record and matches the documentation record to one of the unverified transactions by scoring the attributes extracted from the documentation record against metadata of one of the unverified transactions. If the documentation record matches a transaction, the computing server may then cause a graphical user interface (GUI) to display that one of the transactions was automatically matched with the documentation record.

20 Claims, 8 Drawing Sheets

100

Insights (4)

- Transactions
- Cards
- People
- Bills
- Vendors
- Accounting — 511
- Reimbursements
- My Ramp
- Earn $250

510

Settings

Search & Filter 🔍    Filter by Date 📅

| | Merchant | Amount | User | Acc. Category | Receipt | Memo |
|---|---|---|---|---|---|---|
| ☐ | Gather | $900.00 | Eric G.<br>Op. - Main | 6001 | — | Advertising budget |
| ☐ | Merit | $64.78 | Anshika M.<br>Sales - NY | 6141 | — | |
| ☐ | Bookstore | $95.67 | Alexis G.<br>Bus. Dev. - NY | 6162 | 📇 520 | Purchased books using education... |
| ☐ | ABC | $500.00 | Jesse R.<br>Marketing - WA | 6001 | — | |
| ☐ | ABC | $500.00 | Jesse R.<br>Marketing - WA | 6001 | — | |
| ☐ | Techy | $152.36 | John Y.<br>IT - NY | 6101 | — | |
| ☐ | Techy | $21.76 | John Y.<br>IT - NY | 6101 | ⚠ 530 | *Retrieved automatically* 540 |
| ☐ | ABC | $500.00 | Jesse R.<br>Marketing - WA | 6001 | — | |
| ☐ | Gaia | $71.16 | Patrick Y.<br>Bus. Op. - Main | 6104 | — | |

DOCUMENTATION RECORD RETRIEVAL AND TRANSACTION MATCHING

CROSS REFERENCE TO RELATED APPLICATIONS

This application is a continuation of U.S. patent application Ser. No. 18/116,828, filed on Mar. 2, 2023, which claims the priority benefit of U.S. Patent Provisional Application No. 63/483,973, filed on Feb. 9, 2023, in the United States Patent and Trademark Office, all of which are hereby incorporated by reference in their entirety.

TECHNICAL FIELD

The present disclosure generally relates to verifying transactions in network communications and matching transactions to documentation records.

BACKGROUND

A server charged with monitoring and verifying transactions expends immense processing and network bandwidth resources. Hundreds of thousands of transactions can be made in a single day, each transaction carrying data that must be monitored and verified by the server. One way in which a transaction is verified is through cross checking transaction data generated during the transaction against a record documenting the completion of the transaction. As records may come from many different sources or exist in many different forms, it is challenging not only to retrieve records in an efficient way but also to accurately match them to a corresponding transaction.

SUMMARY

Embodiments are related to transaction verification processes and automated matching of a transaction with a documentation record. In one embodiment, a computing server receives selection criteria from an organization client, where the selection criteria specifies transactions that need to be verified. The computing server processes real-time transactions on behalf of the organization client, where each of the real-time transactions were incurred between a third-party named entity and a transaction account associated with the organization client. The computing server identifies real-time transactions as unverified transactions using the selection criteria. The computing server establishes an access privilege of a third-party server used by the organization client and receives, from the third-party server, communication payloads including a documentation record (e.g., a receipt) automatically generated by a third-party named entity acknowledging an occurrence of a particular real-time transaction. The computing server then extracts attributes from the documentation record. The computing server matches the documentation record to one of the unverified transactions by scoring the attributes extracted from the documentation record against metadata of one of the unverified transactions. The computing server may then cause a graphical user interface (GUI) that allows the organization client to manage the real-time transactions to display that one of the unverified transactions is automatically matched with the documentation record.

BRIEF DESCRIPTION OF THE DRAWINGS

FIG. 5. illustrates an interface for viewing a verified record, in accordance with some embodiments.

Figure 1:
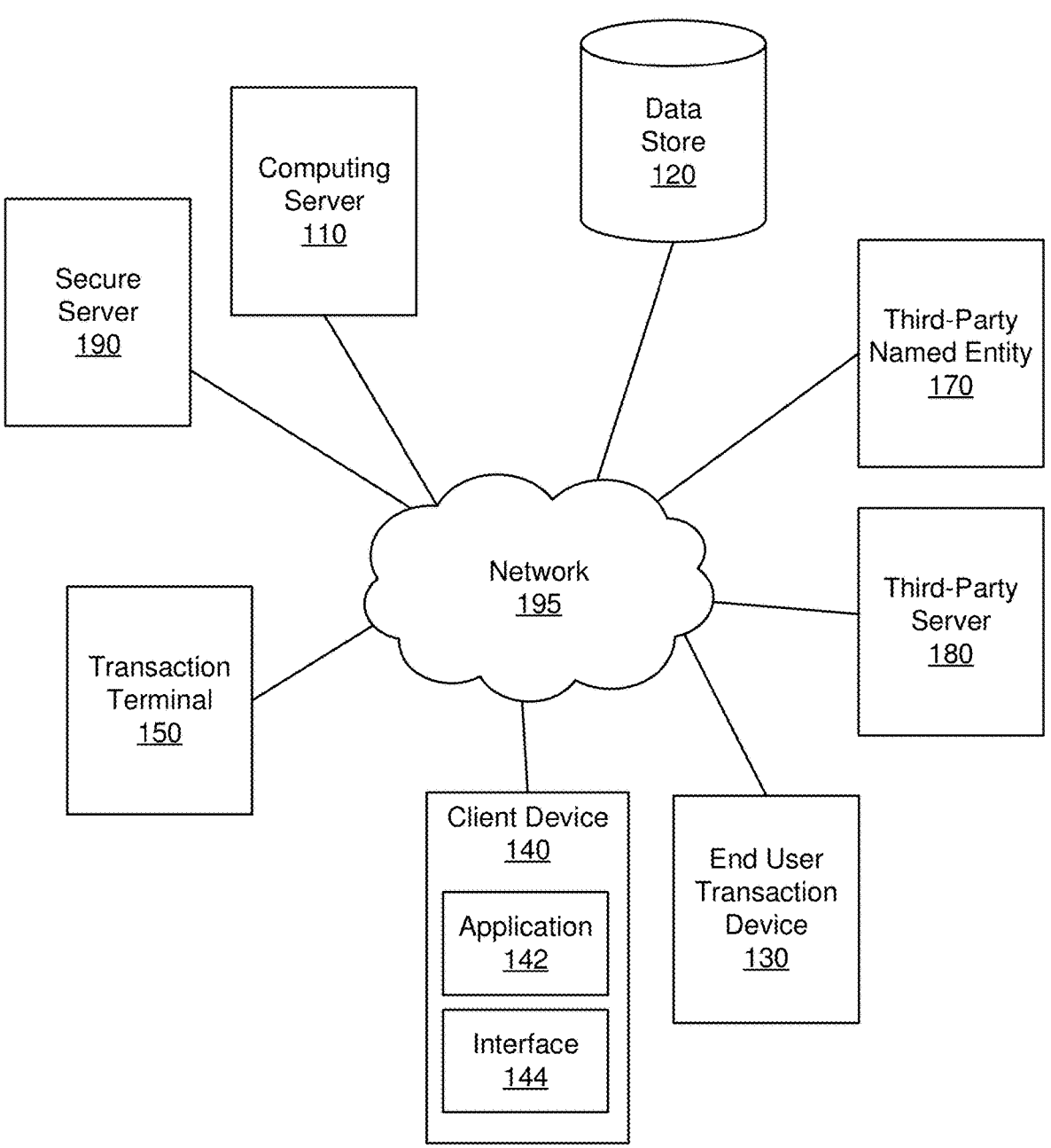
FIG. 1 is a block diagram illustrating an example system environment, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure (FIG.) 1 is a block diagram that illustrates an automated record matching system environment 100, in accordance with some embodiments. The system environment 100 includes a computing server 110, a data store 120, an end user transaction device 130, a client device 140, a transaction terminal 150, a third-party named entity 170, a third-party server 180, and a secure server 190. The entities and components in the system environment 100 communicate with each other through a network 195. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can communicate with multiple end user transaction devices 130 for different end users, who interact with various third-party named entities 170. Different client devices 140 may also access the computing server 110 simultaneously.

The computing server 110 includes one or more computers that perform various tasks related to managing certain transactions on behalf of clients and automatically matching transactions of various clients to documentation records of those transactions that may be generated in other sources. For example, the computing server 110 may create transaction cards (e.g., credit cards) and accounts for an organization client and manages transactions of the cards based on rules set by the client (e.g., pre-authorization and restrictions on certain transactions). Examples of organizations may include commercial businesses, educational institutions, private or government agencies, or any suitable group of one or more individuals that engage in transactions with a named entity (e.g., a merchant) using an account associated with a transaction card. An end user may be a member of an organization client such as an employee of the organization or an individual that uses transaction cards to make purchase from a merchant. In some embodiments, the computing server 110 provides its clients with various payment, spending, and record matching and management services as a form of cloud-based software, such as software as a service (SaaS). Examples of components and functionalities of the computing server 110 are discussed in further detail below with reference to FIG. 2. The computing server 110 may provide a SaaS platform for various clients to manage their accounts and transaction rules related to the accounts.

The data store 120 includes one or more computing devices that include memory or other storage media for storing various files and data of the computing server 110. The data stored in the data store 120 includes accounting information, transaction data, credit card profiles, card rules and restrictions, merchant profiles, merchant identification rules, documentation records, record verification rules, and other related data associated with various clients of the computing server 110. In various embodiments, the data store 120 may take different forms. In some embodiments, the data store 120 is part of the computing server 110. For example, the data store 120 is part of the local storage (e.g., hard drive, memory card, data server room) of the computing server 110. In some embodiments, the data store 120 is a network-based storage server (e.g., a cloud server). The data store 120 may be a third-party storage system such as AMAZON AWS, DROPBOX, RACKSPACE CLOUD FILES, AZURE BLOB STORAGE, GOOGLE CLOUD STORAGE, etc. The data in the data store 120 may be structured in different database formats such as a relational database using the structured query language (SQL) or other data structures such as a non-relational format, a key-value store, a graph structure, a linked list, an object storage, a resource description framework (RDF), etc. In some embodiments, the data store 120 uses various data structures mentioned above.

An end user transaction device 130 is a device that enables the holder of the device 130 to perform a transaction with a party (e.g., a named entity), such as making a payment to a merchant for goods and services based on information and credentials stored at the end user transaction device 130. An end user transaction device 130 may also be referred to as an end user payment device. Examples of end user transaction devices 130 include transaction cards such as credit cards, debit cards, and prepaid cards, other smart cards with chips such as radio frequency identification (RFID) chips, portable electronic devices such as smart phones that enable payment methods such as APPLE PAY or GOOGLE PAY, and wearable electronic devices. The computing server 110 may be the party that issues the end user transaction devices 130 such as credit cards for its organization clients and may impose spending control rules and restrictions on those cards. While credit cards are often used as examples in the discussion of this disclosure, various architectures and processes described herein may also be applied to other types of end user transaction devices 130. In some cases, an end user transaction device 130 may also be a virtual device such as a virtual credit card.

A client device 140 is a computing device that belongs to a client of the computing server 110 or an end user, such as an employee of an organizational client of the computing server 110. A client uses the client device 140 to communicate with the computing server 110 and performs various payment, spending, and record management related tasks such as creating credit cards and associated payment accounts, setting transaction and record verification rules and restrictions on cards, setting pre-authorized or prohibited merchants or merchant categories (e.g., entertainment, travel, education, health, etc.), and matching transactions and records (e.g., verifying a documentation record). The user of the client device 140 may be a manager, an accounting administrator, or a general employee of an organization. While in this disclosure a client is often described as an organization, a client may also be a natural person or a robotic agent. A client may be referred to an organization or its representative such as its employee.

A client device 140 includes one or more applications 142 and interfaces 144 that may display visual elements of the applications 142. The client device 140 may be any computing device. Examples of such client devices 140 include personal computers (PC), desktop computers, laptop computers, tablets (e.g., iPad), smartphones, wearable electronic devices such as smartwatches, or any other suitable electronic devices.

The application 142 is a software application that operates at the client device 140. In some embodiments, an application 142 is published by the party that operates the computing server 110 to allow clients to communicate with the computing server 110. For example, the application 142 may be part of a SaaS platform of the computing server 110 that allows a client to create transaction cards and accounts and perform various payment, spending, and record management tasks (e.g., confirm documentation records have been verified).

In various embodiments, an application 142 may be of different types. In some embodiments, an application 142 is a web application that runs on JavaScript and other backend algorithms. In the case of a web application, the application 142 cooperates with a web browser to render a front-end interface 144. In another embodiment, an application 142 is a mobile application. For example, the mobile application may run on Swift for iOS and other APPLE operating systems or on Java or another suitable language for ANDROID systems. In yet another embodiment, an application 142 may be a software program that operates on a desktop computer that runs on an operating system such as LINUX, MICROSOFT WINDOWS, MAC OS, or CHROME OS.

An interface 144 is a suitable interface for a client to interact with the computing server 110. The client may communicate to the application 142 and the computing server 110 through the interface 144. The interface 144 may take different forms. In some embodiments, the interface 144 may be a web browser such as CHROME, FIREFOX, SAFARI, INTERNET EXPLORER, EDGE, etc. and the application 142 may be a web application that is run by the web browser. In some embodiments, the interface 144 is part of the application 142. For example, the interface 144 may be the front-end component of a mobile application or a desktop application. In some embodiments, the interface 144 also is a graphical user interface (GUI) which includes graphical elements and user-friendly control elements. In some embodiments, the interface 144 does not include graphical elements but communicates with the data store 120 via other suitable ways such as application program interfaces (APIs), which may include conventional APIs and other related mechanisms such as webhooks.

In some embodiments, the client device 140 and the end user transaction device 130 belong to the same domain. For example, a company client can request the computing server 110 to issue multiple company credit cards for the employees. A domain refers to an environment in which a system operates and/or an environment for a group of units and individuals to use common domain knowledge to organize activities, information and entities related to the domain in a specific way. An example of a domain is an organization, such as a business, an institute, or a subpart thereof and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

A transaction terminal 150 is an interface that allows an end user transaction device 130 to make electronic fund transfers with a third party such as a third-party named entity. Electronic fund transfer can be credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 150 may take different forms. For example, if an electronic fund transfer is a credit card payment, the transaction terminal 150 can be a physical device such as a point of sale (POS) terminal (e.g., a card terminal) or can be a website for online orders. An ATM, a bank website, a peer-to-peer mobile application, and an instant messaging application can also be examples of a transaction terminal 150. The third party is a transferor or transferee of the fund transfer. For example, in a card transaction, the third party may be a named entity (e.g., a merchant). In an electronic fund transfer such as a card payment for a merchant, the transaction terminal 150 may generate a transaction data payload that carries information related to the end user transaction device 130, the merchant, and the transaction. The transaction data payload is transmitted to other parties, such as credit card companies or banks, for approval or denial of the transaction.

A third-party named entity 170 may be a third party that conducts transaction with a client of the computing server 110. Third party may be viewed from the perspective of the computing server 110. A named entity may be an identifiable real-world entity. For example, a specific merchant may be a named entity that provides goods or services for purchase by a user using the end user transaction device 130, such as in the situation where an employee uses a virtual credit card issued by the computing server 110 on behalf of the employer to make a purchase with a merchant. Another example of a third-party named entity 170 is a bank which conducts transactions with a company that is the client of the computing server 110. In some embodiments, a third-party named entity 170 may be in control of a transaction terminal 150. For example, a retail chain may be in control of its POS system at a store.

In various embodiments, a third-party named entity 170 may automatically generate a documentation record to document an occurred transaction. The documentation record, which may also simply be referred to as a record, may be generated by the transaction terminal 150 or a server of the named entity. A documentation record serves as a record of a transaction between a named entity and an end user. For example, after a purchase using a POS terminal, the terminal (which broadly may mean the terminal itself or the server of the terminal) may automatically generate a paper or an electronic receipt (e.g., an email receipt) for the customer. A documentation record can include the name of the named entity, a location at which the transaction occurred, a time at which the transaction occurred, an amount which was exchanged during the transaction (e.g., an amount of currency), an itemized list of goods or services purchased, a whole or portion of an identifier of the end user transaction device 130 (e.g., the last four digits of a credit card number), any suitable data describing the transaction, or a combination thereof. The transaction terminal 150 may provide the generated documentation record to the end user transaction device 130, a computing device of the end user (e.g., a laptop computer of the end user), the computing server 110, the secure server 190, the third-party server 180, or a combination thereof. In some embodiments, the documentation record may be included within the transaction data payload. The documentation record may take various forms, including a paper receipt, a digital image of a paper receipt, an email, a short message service (SMS) text, a Quick Response (QR) code, a physical invoice, an electronic invoice, a statement, or any suitable form for providing data describing a transaction to the end user, the computing server 110, or the secure server 190. The documentation record may be an electronic receipt automatically sent from the third-party named entity 170 in response to the occurrence of a real-time transaction.

The third-party server 180 includes one or more computers that perform various tasks related to receiving automatically generated documentation records from the transaction terminal 150 and transmitting communication payloads to the computing server 110 or the secure server 190. A third-party may operate the third-party server 180. In some embodiments, the third-party that operates the third-party server 180 may be the third-party named entity 170. In some embodiments, the third-party that operates the third-party server 180 may be a third-party unrelated to the third-party named entity 170.

The secure server 190 is a computing server that may have a heightened security standard and an isolated environment for connecting with the third-party server 180 and reviewing data from the third-party server 180 that may include personally identifiable information or other sensitive information. In some embodiments, the secure server 190 may receive data from the third-party server 180 directly or from another party such as a mailbox provider of the organization associated with the third-party server 180. The secure server 190 may establish a connection with a mailbox provider to receive message data such as the email data of the organization. The extent of information received by secure server 190 may depend on an agreement between organization and the secure server 190. For example, in some embodiments, the secure server 190 may receive only certain header fields of the message data. In other embodiments, the secure server 190 may receive the entire headers of the message data. In other embodiments, the secure server 190 may receive the body of the messages such as the content of the emails. In other embodiments, the secure server 190 may also receive reports such as message management reports that may or may not contain some or all of the content of the messages. The secure server 190 may analyze the message data and filter the data before the outputs of the secure server 190 are sent to the computing server 110.

In some embodiments, the secure server 190 may communicate with the third-party server 180 via various suitable ways. In some embodiments, an application programming interface (API) allows the secure server 190 to inspect some of the messages, such as emails, directed to or in transit in the third-party server 180. In some embodiments, the API may provide access to the secure server 190 for all contents of the messages or for only part of the data of the messages. In some embodiments, the secure server 190 may include in-line processing of emails.

In some embodiments, the computing server 110 may automatically match documentation records that are generated by a third-party named entity 170 in transactions between various end users and the third-party named entity 170 to the transactions. An organization client may delegate the computing server 110 to manage and approve real-time transactions that involve the use of end user transaction devices 130 of the organization with various third-party named entities 170 (e.g., various merchants). The computing server 110, upon reviewing and approving a transaction in real time, retains a record of the transaction. On the other hand, the third-party named entity 170 may separately generate a documentation record (e.g., an e-receipt) for the transaction. The third-party named entity 170 may transmit the documentation record to the third-party server 180. In turn, the computing server 110, whether directly or through the secure server 190 first filtering the data, may obtain data from the third-party server 180. The computing server 110 automatically identify the documentation record and match the documentation to the transaction that was approved the computing server 110. Further detail of the record matching process will be discussed below in association with FIG. 2 through FIG. 7.

Various servers in this disclosure may take different forms. In some embodiments, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In some embodiments, a server includes one or more virtualization instances such as a container, a virtual machine, a virtual private server, a virtual kernel, or another suitable virtualization instance.

The network 195 provides connections to the components of the system environment 100 through one or more sub-networks, which may include any combination of local area and/or wide area networks, using both wired and/or wireless communication systems. In some embodiments, a network 195 uses standard communications technologies and/or protocols. For example, a network 195 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 195 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 195 may be represented using any suitable format, such as hypertext markup language (HTML), extensible markup language (XML), JavaScript object notation (JSON), structured query language (SQL). In some embodiments, some of the communication links of a network 195 may be encrypted using any suitable technique or techniques such as secure sockets layer (SSL), transport layer security (TLS), virtual private networks (VPNs), Internet Protocol security (IPsec), etc. The network 195 also includes links and packet switching networks such as the Internet. In some embodiments, a data store belongs to part of the internal computing system of a server (e.g., the data store 120 may be part of the computing server 110). In such cases, the network 195 may be a local network that enables the server to communicate with the rest of the components.

Example Server Components

Figure 2:
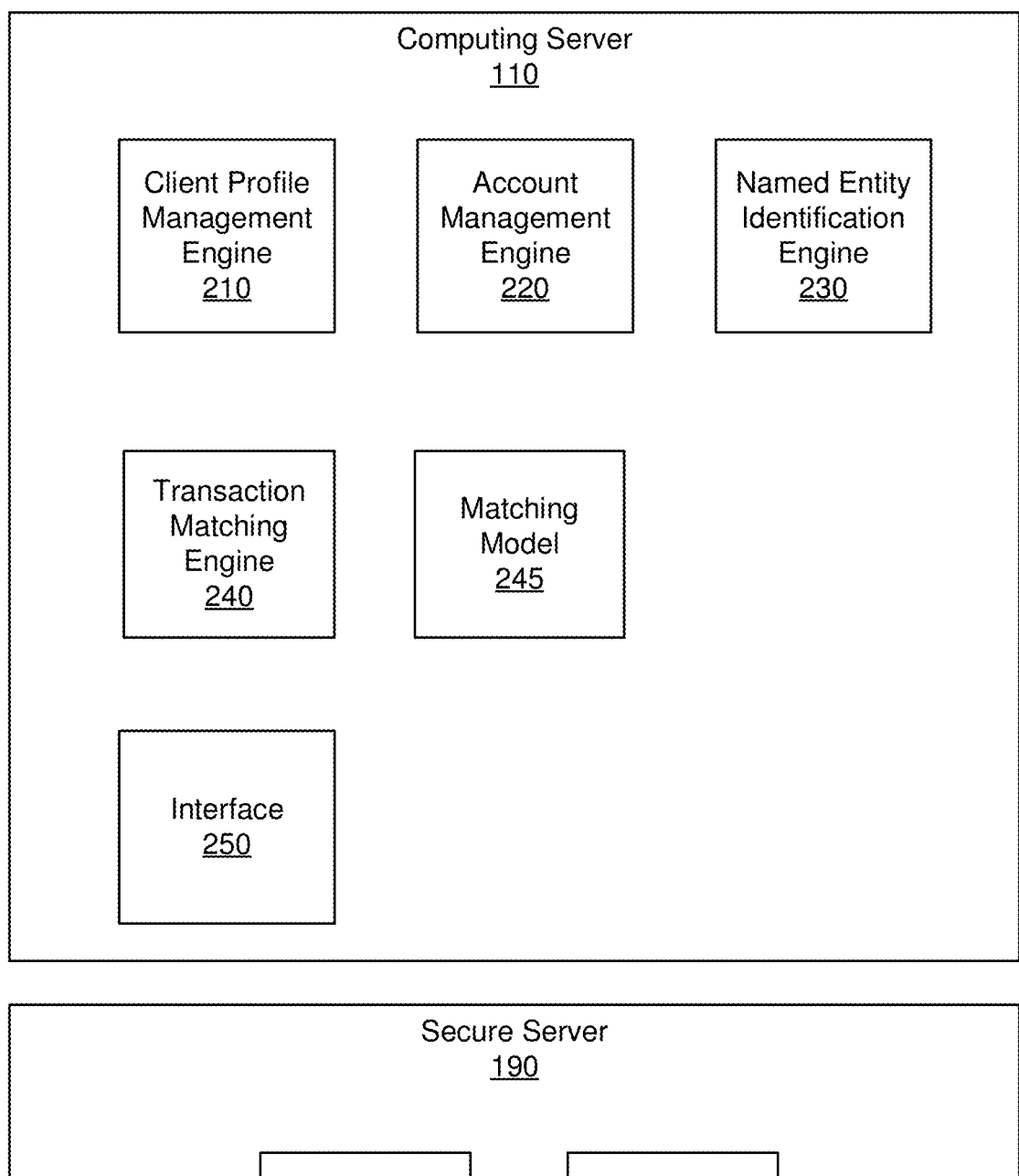
FIG. 2 is a block diagram illustrating components of an example computing server and an example secure server, in accordance with some embodiments.

FIG. 2 is a block diagram illustrating components of a computing server 110 and secure server 190, in accordance with some embodiments. In some embodiments, the computing server 110 includes a client profile management engine 210, an account management engine 220, a named entity identification engine 230, a transaction matching engine 240, a matching model 245, and an interface 250. In various embodiments, the computing server 110 may include fewer or additional components. For example, in some embodiments, the computing server 110 may also include or control a transaction approval server 303 that will be discussed in further detail in FIGS. 3A-B. The computing server 110 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The client profile management engine 210 stores and manages end user data and transaction data of clients of the computing server 110. The computing server 110 can serve various clients associated with end users such as employees, vendors, and customers. For example, the client profile management engine 210 may store the employee hierarchy of a client to determine the administrative privilege of an employee in creating a transaction card account and in setting transaction and record verification rules. An administrator of the client may specify that certain employees from, for example, the financial department and managers have the administrative privilege to create cards for other employees. The client profile management engine 210 assigns metadata tags to transaction data of an organization to categorize the transactions in various ways, such as by transaction types, by merchants, by date, by amount, by card, by employee groups, etc. The client profile management engine 210 can monitor the spending of a client by category and also by the total spending. The spending amounts may affect the results of transaction and record verification rules that are specified by a client's system administrator. For example, a client may limit the total monthly spending of an employee group. The computing server 110 may deny further card payments after the total spending exceeds the monthly budget.

The transaction data stored by the client profile management engine 210 can include a record of a transaction, where the record includes data such as an amount of the transaction, the date of the transaction, a named entity that accepted a request by the end user to initiate the transaction (e.g., the merchant that accepted an end user's request to purchase the merchant's service), or combination thereof. The transaction data may be generated from various sources. For example, in some cases, the computing server 110 approves real-time transactions (e.g., credit card transactions) on behalf of an organization client. As such, an entry of the transaction is created as the computing server 110 approves the real-time transaction. In some cases, the computing server 110 may receive data in bulk from a third-party server 180 and the computing server 110 may parse the data to search for relevant transaction data. In yet other cases, the computing server 110 may receive transactions data from other platforms or software such as an accounting platform, a bank, etc.

The client profile management engine 210 may store the data in a suitable data structure. For example, for transaction data that are received from third-party server 180 (whether directly or via a filtering from the secure server 190), the client profile management engine 210 may store the record as provided by the secure server 190 or the third-party server 180. In some embodiments, the client profile management engine 210 may store emailed receipts as provided by the secure server 190 or the third-party server 180. In some embodiments, the data from the third-party server 180 may be unstructured such as data included in communications like emails. The client profile management engine 210 may parse the substance of the data and turn the data into structured transaction data.

The account management engine 220 creates and manages accounts including payment accounts such as transaction cards that are issued by the computing server 110. An account is associated with an end user such as an employee and corresponds to an end user transaction device 130 (e.g., end user transaction device 130 can be a physical card or a virtual credit card). A client may use the computing server 110 to issue domain-specific payment accounts such as company cards. The client enters account information such as the cardholder's name, role, and job title of the cardholder in the client's organization, limits of the card, and transaction rules associated with the card. The client may use the client device 140 and the interface 144 to supply this information to the computing server 110. In response to receiving the account information (e.g., from the client device 140), the account management engine 220 creates the card serial number, credentials, a unique card identifier, and other information needed for the generation of a payment account and corresponding card. The account management engine 220 associates the information with the cardholder's identifier. The computing server 110 communicates with a transaction card company (e.g., VISA, MASTERCARD) to associate the card account created with the identifier of the computing server 110 so that transactions related to the card will be stored at client profile management engine 210 with a mapping to identifiers for the account and the client's organization for querying transactions of the client organization. The account management engine 220 may also order the production of the physical card that is issued under the computing server 110.

A transaction rule may govern how a transaction may be handled during the approval process and/or after the transaction. For example, the cards and payment accounts created are associated with the transaction and documentation record verification rules that are specified by the client's administrator. An organization client may specify one or more selection criteria that certain transaction will need to be verified. Verification may be performed by matching the transaction with a documentation record such as a receipt. As discussed in further detail below, to reduce the burden on the employee or the administrator in verifying the transaction, the computing server 110 may automatically find a documentation record and match the record with the transaction, using various processes discussed below.

In some embodiments, the account management engine 220 creates rules for matching records to transactions. A client may specify rules under which records are to be matched to transactions by the computing server 110. The client may use the interface 144 of the client device 140 to specify the rules. The rules may include a location, time, named entity, end user, account, amount (e.g., purchase amount), or any suitable parameter related to a transaction. In one example of a rule, the client specifies that a documentation record is not required to be matched to a transaction for transaction amounts below 75 dollars for merchants in a travel category. In another example of a rule, the client specifies that a documentation record is required to be matched to a transaction for transactions made outside of the United States. The client may specify priority for rules such that a certain rule may override another rule. For example, the account management engine 220 may determine that, under the previous two examples of rules, the client has specified that rules for requiring record matching overrides rules for not requiring matching and cause the transaction analysis engine 240 to match a documentation record to a transaction for, for example, a transaction made for a train ticket in Europe using an end user transaction device issued for an end user of the client.

Upon determining that matching is or is not needed using the rules created by the account management engine 220, the transaction analysis engine 240 may annotate a record of the transaction with an indicator for the corresponding matching requirement (e.g., matching needed or not needed). This indicator may be used when generating a user interface for the client when managing matching statuses of past transactions (e.g., example interface of FIG. 5). Additionally, the indicator may be used to generate notifications to end users to notify the end users of the rules under which a documentation record is not necessary, which may prevent subsequent upload of records and save communication bandwidth and server storage resources. A client may establish such rules through an interface generated by the interface 250 (e.g., example interface of FIG. 6).

The named entity identification engine 230 identifies specific named entities (e.g., merchants) associated with various transactions. The computing server 110 may impose an entity-specific restriction on a card. For example, an administrator of a client may specify that a specific card can only be used with a specific named entity. The computing server 110 parses transaction data from different clients to identify patterns in the transaction data specific to certain named entities to determine whether a transaction belongs to a particular named entity. For example, in a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 230 applies various algorithms and machine learning models to determine the actual merchant from the transaction data. For example, the named entity identification engine 230 may search for patterns in transaction data associated with a particular merchant to determine whether a transaction belongs to the merchant. For example, a merchant may routinely insert a code in the merchant name or a store number in the merchant name. The named entity identification engine 230 identifies those patterns to parse the actual merchant name.

A named entity identification process may be used to determine the identities of named entities included in processed real-time transaction. In some embodiments, the computing server 110 determines a named entity identification rule by analyzing patterns in the volume of data associated with the plurality of clients. For example, the volume of data may include past transaction data payloads of different clients. The computing server 110 may analyze the past transaction data payloads to determine a common pattern associated with payloads of a particular named entity. The named entity identification rule may specify, for example, the location of a string, the prefix or suffix to removed, and other characteristics of the data payload. The computing server 110, upon the receipt of a transaction data payload, identifies a noisy data field in the transaction data (e.g., a noisy string of text). A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The computing server 110 parses the representation of the named entity based on the named entity identification rule. A transaction approval process can be based on the identity of the named entity. This general framework may be used by one or more computing servers to identify named entities in transaction data payloads.

U.S. patent application Ser. No. 17/351,120, entitled "Real-time Named Entity Based Transaction Approval" and filed on Jun. 17, 2021, is incorporated in its entirety herein for all purposes.

The transaction matching engine 240 matches a documentation record that may be generated by a third-party named entity 170 with a transaction stored in the computing server 110, such as a transaction made using an end user transaction device 130. The transaction matching engine 240 receives data from the secure server 190 or from the third-party server 180. The data may include one or more documentation records that are mixed with other information such as irrelevant communication. The data may be transmitted to the computing server 110 in bulk such as in a communication payload that includes a collection of communications, which can be a collection of emails, collections of receipts that may or may not be relevant, or in other forms. The transaction matching engine 240 may in turn identify the relevant documentation record, parse the relevant information, and match the documentation record with a transaction stored in the computing server 110. For example, where the documentation record is a receipt inside of a communication payload that includes a number of emails associated with an employee, the computing server 110 may search for data associated with the record, such as the timestamp of the email or the sender of the email, even though this data may not be directly located in the documentation record itself. The transaction matching engine 240 may receive the documentation record unprompted (e.g., documentation record may be transmitted from third-party server 180 through push mechanisms such as webhook) or as a result of a request made to the secure server 190 or the third-party server 180. Requests may be initiated by the computing server 110, manually by an administrator or automatically. Requests may be initiated periodically, or may be initiated in response to other stimuli, for example when the computing server receives a transaction that fits the matching criteria selected by the organization client 301.

The transaction matching engine 240 may process the documentation record. Processing the documentation record may include extracting attributes from the documentation record, wherein an attribute includes data or metadata associated with the documentation record. For example, when the documentation record documents a transaction between an end user and a merchant, attributes may include the date of the transaction, the amount transacted, the name of the merchant, or personal data about the end user, such as the end user's credit card information. When the documentation record is included an email, attributes may be included in various header fields (e.g., the "To" field, the "From" field, the "Subject" field), the body, hidden text, attachments, timing data, or any other data commonly found in emails.

The transaction matching engine 240 may perform different methods of attribute extraction depending on the medium in which the documentation record is provided or depending on the server it receives the documentation record from. For example, a documentation record received from the third-party server 180 may contain known attributes, such as the identity of the named entity, which may allow the transaction matching engine 240 to extract fewer attributes overall from the record. The transaction matching engine 240 may extract attributes using a text search method or natural language processing.

The transaction matching engine 240 may match a documentation record to a past transaction. The transaction matching engine 240 may identify a set of candidate past transactions to match the documentation record to. A set of candidate past transactions may include transactions with timestamps within a time window corresponding to a timing record included in the documentation record. For example, if a documentation record contains timing data that suggests it was created on October $5^{th}$ at 10:32 am EST, candidate transactions may be transactions with timestamps on October $5^{th}$, or, more granularly, timestamps on October $5^{th}$ from 9:32 am EST to 11:32 am EST, for example. The transaction matching engine 240 may determine a match between a documentation record and a candidate past transaction by matching attributes extracted from the documentation record to transaction metadata. For example, where the documentation record is an electronic receipt, the transaction matching engine 240 may identify candidate transactions by identifying a message header in the electronic receipt, determining, using the message header, that the electronic receipt was transmitted from an automated system associated with a particular third-party named entity to an electronic address of an end user, and identifying a set of candidate transactions incurred between a plurality of third-party named entities and the transaction account associated with the electronic address.

In various embodiments, matching may be performed using various algorithms, rules, and other criteria. For example, certain fields may require a closer match (or even an exact match) while other fields may be matched more loosely. In some embodiments, matching may also be performed using scoring of the matching information in various fields. For example, a match between a documentation record and a transaction may be determined by a match between the record's and the transaction's respective amounts, named entities (e.g., merchants), dates, or any suitable data related to a transaction that is recorded or reported in the execution of a transaction (e.g., by the transaction terminal 150). The transaction matching engine 240 may assign weights to the attributes that match the metadata of one of the unverified transactions and sum the weighted attributes to generate a score. The transaction matching engine 240 may compare the generated score to a threshold score and determine a match if the generated score exceeds the threshold score. A client may specify the threshold score value to the computing server 110 (e.g., via the interface 144). The transaction matching engine 240 may stipulate that one of the attributes be an exact match in order for the record to match the transaction. The transaction matching engine 240 may alternatively or additionally stipulate that if some attributes do not match, the record is not a match with the transaction.

The transaction matching engine 240 may apply the matching model 245 to a documentation record and one or more past transactions to determine if the record matches a past transaction. The matching model 245 receives, as input, a processed or unprocessed documentation record or representation thereof (e.g., a feature vector where values of the vector are related to the documentation record) and one or more past transactions. The matching model 245 determines, as output, a match between a documentation record and a past transaction. The matching model 245 may output a level of confidence associated with the match. The matching model 245 may include a ruled based algorithm, such as a heuristic algorithm, a decision tree, or a machine learning model.

The matching model 245 may include one or more machine learning models that are trained to recognize text and natural language. One or more machine learning models may also be trained to identify relevant fields in a documentation record or past transaction, such as the date, the merchant name, and the transaction amount. One or more machine learning models may also be trained to recognize named entities. Examples of training of machine learning models are further discussed in FIG. 7.

Figure 6:
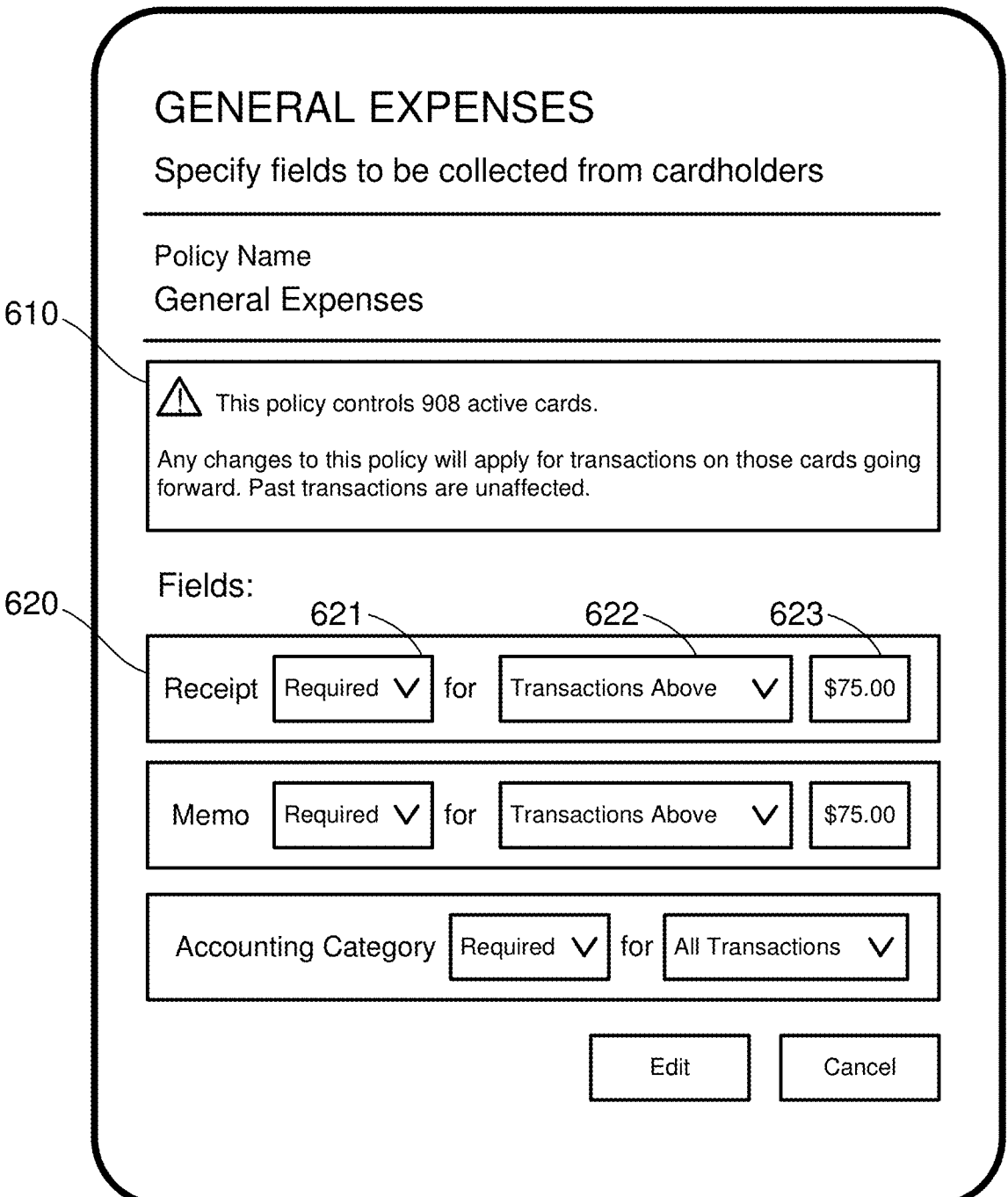
FIG. 6. illustrates a verification setting portal, in accordance with some embodiments.

The interface 250 includes interfaces that are used to communicate with different parties and servers. For example, the interface 250 may display that a documentation record is automatically found by the computing server 110 for a particular transaction and mark the transaction as verified. The interface 250 may take the form of a SaaS platform that provides clients with access of various functionalities provided by the computing server 110. The interface 250 provides a portal in the form of a graphical user interface (GUI) for clients to create payment accounts, manage transactions, specify rules of each card, verify records of transactions incurred using the cards, and manage data (e.g., documentation records, transaction records, or matches between documentation records and transaction records). Managing data may include exporting data, such as to accounting software, or restructuring data, such as to include fields that satisfy one or more compliance requirements of a government agency. Examples of the GUI elements of the interface 250 are shown in FIGS. 5-6. The interface 250 is in communication with the application 142 and provides data to render the application 142.

In some embodiments, the interface 250 also includes an API for clients of the computing server 110 to communicate with the computing server 110 through machines. The API allows the clients to retrieve the computing server 110 stored in the data store 120, send query requests, and make settings through a programming language. Various settings, creation of cards, rules on the cards, rules of verifying records, and other functionalities of the various engines 210, 220, 230, and 240 or model 245 may be changed by the clients through sending commands to the API.

A secure server 190 may serve as an intermediate server that perform filtering of data sent from a third-party server 180 before the data is provided to the computing server 110. For example, an organization client of computing server 110 may grant unlimited access privilege of certain data of the organization to the computing server 110. To secure and safeguard sensitive data of the organization, the computing server 110 may set up a separate secure server 190 to conduct certain types of filtering so that more relevant data are sent to the computing server 110. Sensitive yet irrelevant data may be filtered by the secure server 190. In some embodiments, a secure server 190 may not be present and any actions or capabilities of the secure server 190 may also be performed by the computing server 110.

In some embodiments, the secure server 190 includes a record identifier 260 and an identification model 270. In various embodiments, the secure server 190 may include fewer or additional components. The secure server 190 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The record identifier 260 determines if a communication payload from a third-party server 180 contains one or more relevant documentation records. A communication payload is a collection of data, structured or unstructured, that is transmitted from a third-party server 180 as an organization client of the computing server 110 authorizes the computing server 110 to gain access to the organization's data that is stored on the third-party server 180. A communication payload may include data and records that are sent individually or in bulk as a payload. For example, the third-party server 180 may be an email server of an organization and the third-party server 180 may periodically transmit copies of emails to the secure server 190 or to the computing server 110. Each email may correspond to a communication payload, or the communication payload may include a collection of related or unrelated emails, depending on how third-party server 180 packages the payloads. In another example, the third-party server 180 may be a record server that transmits receipts related to the organization to the secure server 190 or the computing server 110. The communication payload may include one or more relevant documentation records that the computing server 110 is trying to match but may also include irrelevant data. For example, in the case of emails, the email server may send a bulk of filtered or unfiltered emails to the secure server 190 and one or more receipts included in some emails and other emails that are irrelevant. In the case of a record server, the data in a communication payload may be more structured. However, not all receipts may be the documentation records that are targeted by the computing server 110. For examples, some receipts may document transactions that did not involve approval from the computing server 110.

The record identifier 260 may receive communication payloads unprompted or in response to a request made to the third-party server 180. Requests may be initiated by the computing server 110 or the secure server 190, either manually by an administrator or automatically. Requests may be initiated periodically, or may be initiated in response to other stimuli, for example when the secure server 190 has handled an amount of requests below a threshold in a time window.

The record identifier 260 may process the received communication payloads. The record identifier 260 may process the communication payload upon receiving, may wait until a threshold amount of communication payloads have been received, or may process a subset of communication payloads received. Processing may include parsing communication payloads to identify keywords or different types of data, such as image versus text data, or to convert data in the communication payload to a specific format. The record identifier 260 may use natural language processing techniques to parse the communication payload. Processing may alternatively or additionally include filtering data associated with the communication payload. The record identifier 260 may use a regular expression to filter the communication payload for specific fields, such as the sender of the communication payload, the recipient of the communication payload, or the timestamp of the communication payload.

The record identifier 260 determines if a communication payload, processed or unprocessed, contains a relevant documentation record. The record identifier 260 may compare the data associated with the communication payload to signals that indicate the presence of a documentation record, where signals may include, among other things, a threshold number of keywords, a sender of the communication payload identified as a merchant, a known format or structure of a receipt, a keyword in a subject line that indicates the presence of a receipt, text strings that fit certain regular expression patterns, features that are identified by a machine learning model, or any other suitable signals.

The record identifier 260 may apply the identification model 270 to data in one or more communication payloads. The identification model 270 receives, as input, a processed or unprocessed communication payload or representation thereof (e.g., a feature vector where values of the vector are related to the communication payload) and determines, as output, if the communication payload contains a documentation record.

The identification model 270 may include one or more machine learning models that are trained to recognize text and natural language. One or more machine learning models may also be trained to identify relevant fields in a communication payload, such as the "To" field, the "From" field, and the "Subject" field of an email. One or more machine learning models may also be trained to recognize named entities. Examples of training of machine learning models are further discussed in FIG. 7.

Record Verification Process

Figure 3A:
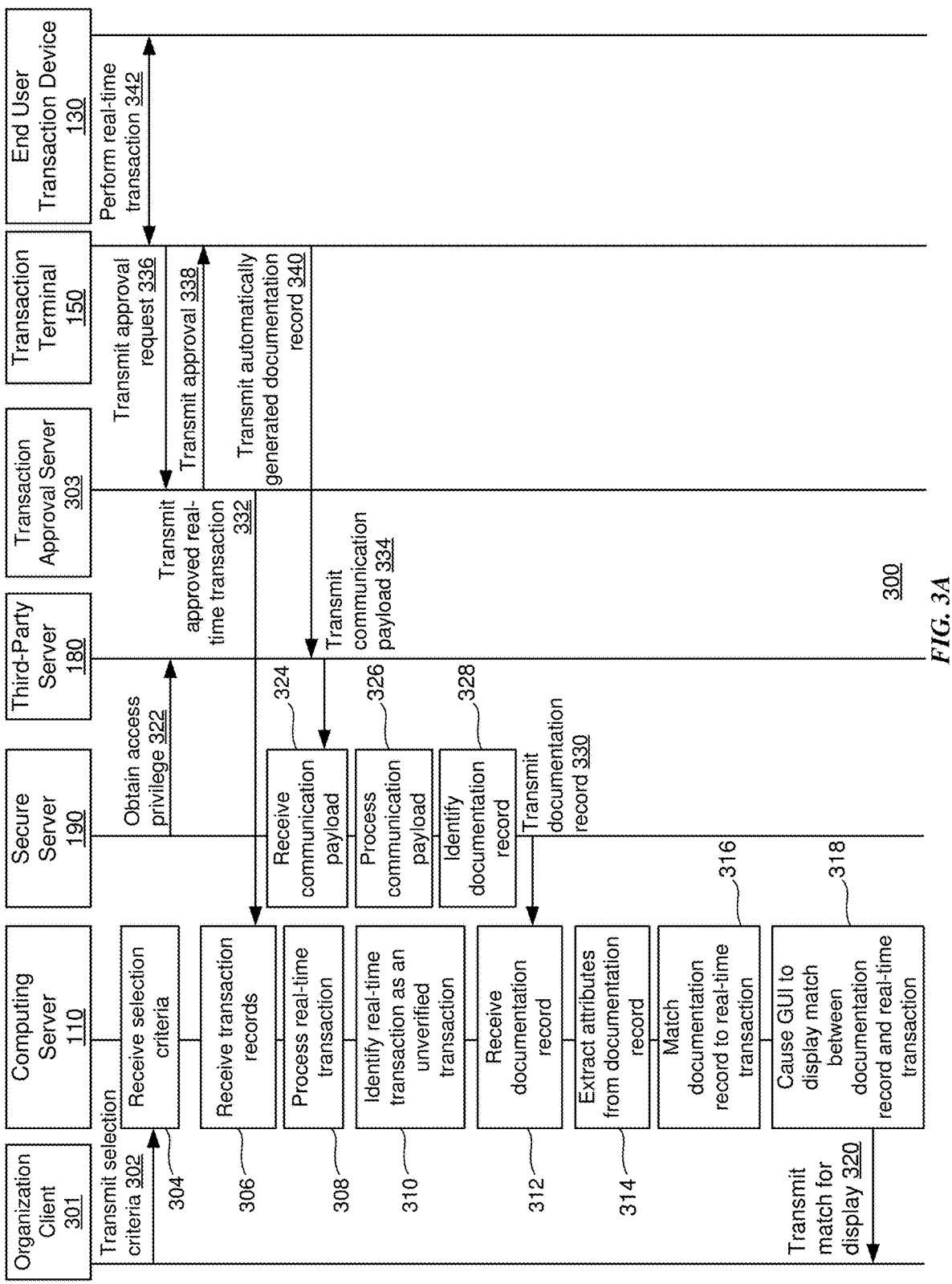
FIG. 3A is an interaction diagram depicting a computer-implemented process for matching a documentation record with a real-time transaction, in accordance with some embodiments.

FIG. 3A is an interaction diagram illustrating a computer-implemented process 300 for matching a documentation record with a transaction, in accordance with some embodiments. The process 300 may be performed among an organization client 301, the computing server 110, the secure server 190, the third-party server 180, a transaction approval server 303, the transaction terminal 150, and the end user transaction device 130. For the particular embodiment discussed in FIG. 3A, the computing server 110, the secure server 190, the third-party server 180, and the transaction approval server 303 are located separately (e.g., independently operating servers). In some embodiments, the transaction approval server 303 may be part of the computing server 110 or controlled by the computing server 110.

Figure 3B:
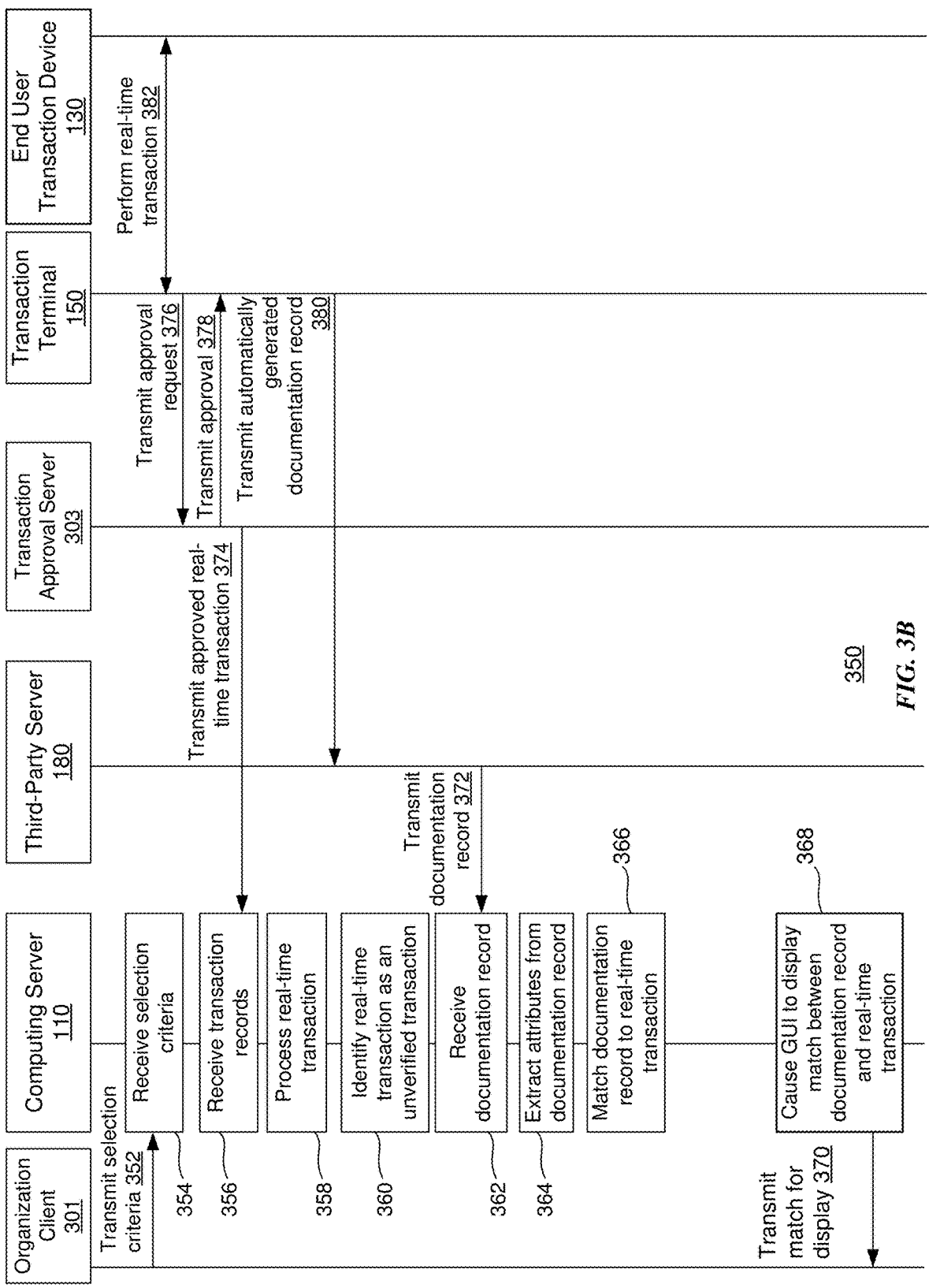
FIG. 3B is an interaction diagram depicting a computer-implemented process for matching a documentation record with a real-time transaction, in accordance with some embodiments.

While the steps in processes 300 and 350 are illustrated graphically in FIGS. 3A and 3B as sequences of steps, some of the steps may occur in different sequences than illustrated or may occur concurrently with other steps. Also, while the process 300 or 350 is depicted as a single series, in various embodiments and situations a process may be further broken down into multiple series.

In the process 300, the organization client 301 may transmit 302 selection criteria to the computing server 110, which receives 304 the selection criteria. The selection criteria may specify transactions that need to be verified. The selection criteria may relate to parameters of a transaction (e.g., amount, date, location, goods or service purchased, etc.), parameters of a transaction account (e.g., the end user, an employee title of the end user, a credit limit of the account, etc.), parameters of the third-party named entity (e.g., the name of a merchant, a location of the merchant, a merchant category, etc.), or any suitable parameter describing the transaction. In one example of selection criteria, the organization client 301 specifies that transactions made for an amount over one hundred dollars during the months of June through August in the "travel" merchant category are required to be matched to a documentation record. An example user interface for specifying selection criteria is shown in FIG. 6.

Separately, either in parallel or asynchronously, an end user transaction device 130, associated with an end user, performs 342 a real-time transaction with a transaction terminal 150, associated with a third party such as the third-party named entity 170. A real-time transaction may be a credit card purchase or another event where the transaction approval server 303 is asked to approve in real time a transaction that involves a transaction account managed by the organization client 301. For example, the third-party named entity 170 may be an airline ticketing service and the end user may use a computing device (e.g., a laptop) and the end user transaction device 130 (e.g., a credit card) to purchase plane tickets online from a website of the third-party named entity. The transaction terminal 150 transmits an approval request 336 to the transaction approval server 303, which receives the approval request and transmits 338 an approval back to the transaction terminal 150.

Either in parallel or asynchronously, the transaction approval server 303, which may be controlled by the computing server 110 or be part of the computing server 110, transmits 332 a record of the approved real-time transaction to the computing server 110. For example, as the transaction approval server 303 approves a credit card transaction, a record of such approval is transmitted to the computing server 110.

On the other hand, the transaction terminal 150 transmits 340 an automatically generated documentation record to the third-party server 180. The automatically generated documentation record may be an electronic receipt. For example, at the transaction, the end user may enter her email address and ask a receipt to be sent to her email account. In turn, the transaction terminal 150 transmits 340 the automatically generated documentation record to an email server, which is an example of the third-party server 180.

The computing server 110 receives 306 transaction records from the transaction approval server 303. Transaction records may include information regarding the approved transaction such as the transaction account (e.g., credit card number) involved in the transaction, an identifier of a merchant involved in the transaction, the amount, or the date of the transaction.

The computing server 110 processes 308 the approved real-time transaction on behalf of the organization client 301 by storing the transaction information in a database (e.g., in the account management engine 220). The computing server 110 may maintain a data structure of the transaction information, where each entry in the data structure corresponds to a real-time transaction. In a given period, the computing server 110 may manage different organization clients and each client may have a large number of transaction accounts (e.g., corporate credit card accounts). As such, the computing server 110 may process a large number of real-time transactions on behalf of various organization clients.

The computing server 110 identifies 310 the real-time transaction as an unverified transaction. The unverified transaction includes one or more fields that need to be verified. The fields can include an amount of the transaction, a date of the transaction, a name of the named-entity involved in the transaction (e.g., a merchant name), or any other suitable parameter of the transaction that is provided with a documentation record. The computing server 110 may use the selection criteria specified by the organization client 301 to determine that the transaction needs to be verified. For example, the selection criteria specifies that transactions with amounts over one hundred dollars during the months of June through August in the "travel" merchant category are required to be verified.

The third-party server 180, having received the automatically generated documentation record from the transaction terminal 150, transmits 334 a communication payload to the secure server 190. The communication payload may include the automatically generated documentation record received by the third-party server 180 from the transaction terminal 150 but may also include other irrelevant information. The third-party server 180 may transmit the communication payload automatically or in response to a request from the computing server 110 or the secure server 190. The third-party server 180 may transmit a set of communication payloads, such as a set of communication payloads that have been received by the third-party server since the previous transmission of communication payloads.

Having previously obtained 322 access privilege from the third-party server 180, the secure server 190 receives 324 the communication payload. Access privilege includes the rights and abilities assigned to a specific authorized user account. Access privilege may include what information may be accessed, in what capacity information may be accessed (e.g., read-only access versus write access), or where information may be accessed (e.g., on a local area network or a virtual private network). For example, the secure server 190 may obtain access privilege from the third-party server 180 that allows it to access information in the form of the text content of emails but restricts or anonymizes information that pertains to a user's identity, such as a user's email address, name, or phone number. In another example, the secure server 190 may obtain access privilege from the third-party server 180 that allows only a select set of user accounts, such as administrator accounts associated with the computing server 110, to access information.

The secure server 190 processes 326 the communication payload. The processing can be done via various suitable ways, such as those discussed in FIG. 2 in association with the record identifier 260. The secure server 190 identifies 328 the documentation record. The identification may be done in the ways discussed in the record identifier 260 of FIG. 2.

The secure server 190 transmits 330 the identified documentation record to the computing server 110, which receives 312 the documentation record. The secure server 190 may transmit 330 the communication payload containing the documentation record or select data from the communication payload containing the documentation record.

The computing server 110 extracts 314 attributes from the documentation record and matches 316 the documentation record to a real time transaction. The extraction and matching can be done via various suitable ways, such as those discussed in FIG. 2 in association with the transaction matching engine 240.

The computing server 110 causes 318 a graphical user interface to display the match between the documentation record and the transaction and transmits 320 the match to the organization client 301 for display.

FIG. 3B is an interaction diagram illustrating a computer-implemented process 350 for matching a documentation record with a transaction, in accordance with some embodiments. The process 350 is performed among an organization client 301, the computing server 110, the third-party server 180, a transaction approval server 303, the transaction terminal 150, and the end user transaction device 130. For the particular embodiment discussed in FIG. 3B the computing server 110, the third-party server 180, and the transaction approval server 303 are located separately (e.g., independently operating servers). In some embodiments, the transaction approval server 303 may be part of the computing server 110 or controlled by the computing server 110. The steps involved are similar to those described in FIG. 3A, with the main difference being that the third-party server 180 transmits 372 the documentation record directly to the computing server 110 instead of transmitting a communication payload to a secure server.

The process 350 begins with the organization client 301 transmitting 352 selection criteria to the computing server 110, which receives 354 the selection criteria. Separately, either in parallel or asynchronously, the end user transaction device 130, associated with an end user, performs 382 a real-time transaction with the transaction terminal 150, associated with a third party such as a third-party named entity. The transaction terminal 150 transmits an approval request 376 to the transaction approval server 303, which receives the approval request and transmits 378 an approval back to the transaction terminal 150.

Either in parallel or asynchronously, the transaction approval server 303 transmits 374 the approved real-time transaction to the computing server 110 and the transaction terminal 150 transmits 380 an automatically generated documentation record to the third-party server 180.

The computing server 110 receives 356 transaction records from the transaction approval server 303. The computing server 110 processes 358 the approved real-time transaction on behalf of the organization client 301. The computing server 110 identifies 360 the real-time transaction as an unverified transaction.

The third-party server 180 transmits 372 a documentation record to the computing server 110, which receives 362 the documentation record. The computing server 110 extracts 364 attributes from the documentation record and matches 366 the documentation record to a real time transaction.

The computing server 110 causes 368 a graphical user interface to display the match between the documentation record and the real-time transaction and transmits 370 the match to the organization client 301 for display.

Record Verification Interfaces

FIG. 4 through FIG. 7 depict various interfaces for interacting with the computing server 110 to match documentation records with transactions, in accordance with some embodiments.

Figure 4:
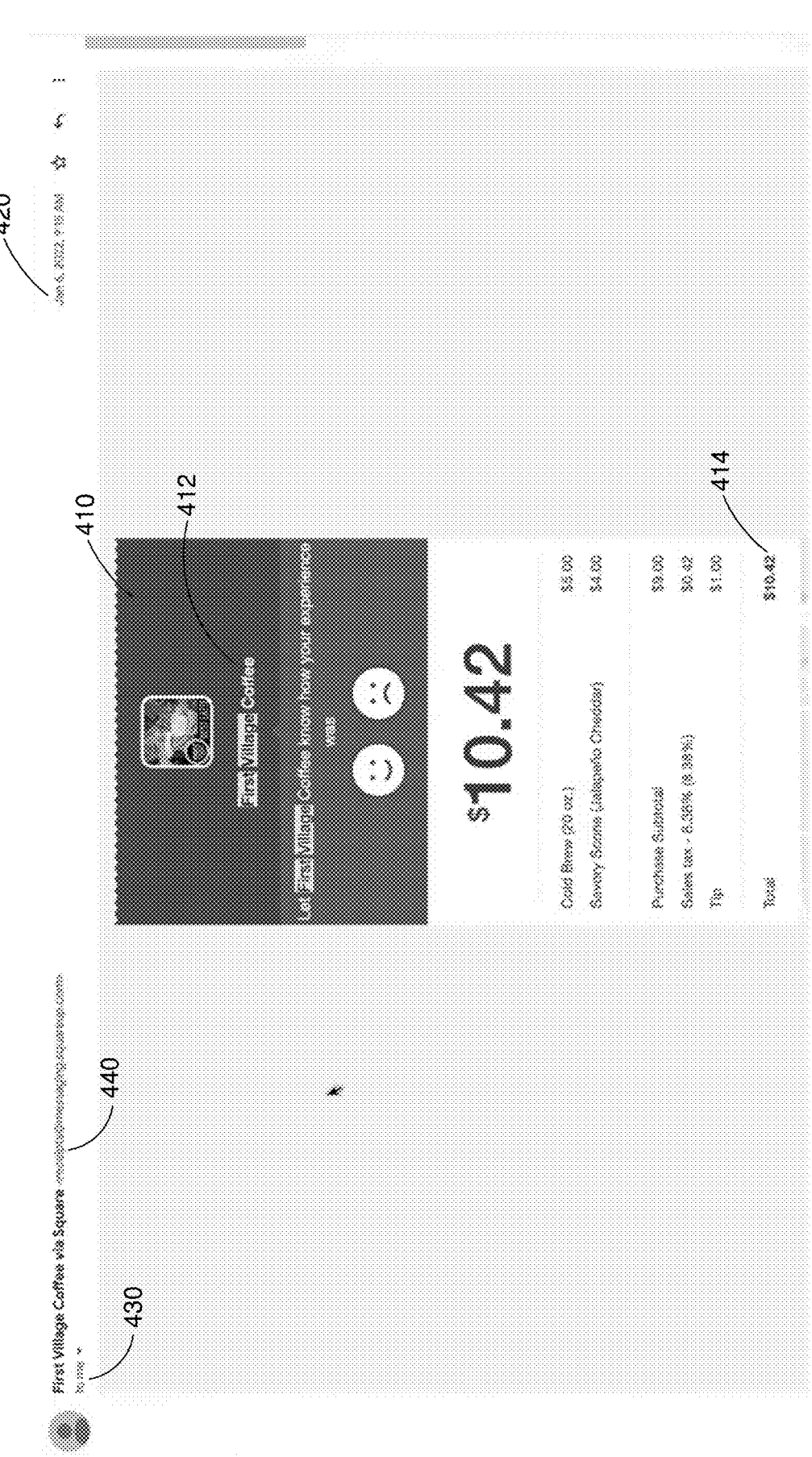
FIG. 4 illustrates a communication payload containing a documentation record, in accordance with some embodiments.

FIG. 4 illustrates an example email that may be included in a communication payload, in accordance with some embodiments. The email itself may be a communication payload or multiple emails may be packaged as a communication payload. The email 400 contains a documentation record 410, a timestamp 420, a "To" field 430, and a "From" field 440. The documentation record includes additional information such as a merchant name 412 and a transaction amount 414. In an embodiment, the secure server 190 may process the email 400 by filtering the "To" field 430 and the "From" field 440. The secure server 190 may identify that the email 400 contains a transaction by searching a data store containing email addresses of known merchants, such as data store 120, and determining that the email address in the "From" field 440 corresponds to an email address of a known merchant. The secure server 190 may determine that the email 400 contains a documentation record. The secure server 190 may transmit the documentation record 410 to the computing server 110. The computing server 110 may then extract attributes from the documentation record 410, such as the merchant name 412 and the transaction amount 414. The computing server 110 may additionally or alternatively extract attributes from the email 400 that contains the documentation record 410, such as the timestamp 420, the "To" field 430, or the "From" field 440. The computing server 110, having extracted attributes, may use those attributes to match the documentation record 410 to a real-time transaction. An example of matching could include finding a real-time transaction with timestamp within one minute of the timestamp 420 or finding a real-time transaction with the same transaction amount 414 and merchant name 412.

FIG. 5 illustrates a record verification control portal 500, in accordance with some embodiments. The portal 500 is a GUI that may be provided by the interface 250 of the computing server 110. The portal 500 may be used by an organization client administrator to manage transaction accounts (e.g., credit cards) issued to end users. The portal 500 includes a navigation menu 510 and a navigation option 511 for "Accounting." Upon selecting the option 511, the portal 500 may display a data structure (e.g., a table) listing transactions made with transaction accounts issued to the end users. As shown in the portal 500, the table is organized by fields such as merchant name, transaction amount, end user's name, accounting category, a flag indicating whether a documentation record has been updated, and a memo describing the transaction (e.g., the purpose of the transaction). A flag 520 indicates that the transaction is verified by the computing server 110, which finds a documentation record matching the transaction (e.g., via a forward of an image of a paper receipt or by an automated matching process 300 or 350) and a flag 530 indicates that verification is needed (e.g., as specified by selection criteria chosen by an administrator) but has not been provided by the end user or has not been automatically located through screening of emails of the organization by the computing server 110. A computer server-generated memo 540 may provide further information to the administrator that the documentation record is retrieved automatically.

FIG. 6 illustrates a verification setting portal 600, in accordance with some embodiments. The portal 600 is a GUI that may be provided by the interface 250 of the computing server 110. The portal 600 includes various input elements for a user (e.g., an organization client administrator) to specify one or more selection criteria for which transactions and their corresponding documentation records need to be verified by the computing server 110. The portal 600 includes a notification 610 and a selection criteria input entry 620, where the input entry 620 further includes a requirement level input field 621, a transaction condition input field 622, and a transaction amount input field 623. The notification 610 informs an administrator of a number of transaction accounts for which settings specified through the portal 600 affect. In this example, nine hundred and eight transaction accounts are subject to the selection criteria specified through the portal 600. The input entry 620 is used to set selection criteria for which transactions and corresponding documentation records are to be verified by the computing server 110. In this example, records are required for transactions above 75 dollars. The requirement level input field 621 may be a dropdown menu allowing the administrator to select from options such as "required" and "not required." The transaction condition input field 622 may be a dropdown menu allowing the administrator to select options such as "transactions above," "transactions equivalent to," or "transactions below." The transaction amount input field 623 may be an editable text input field allowing the administrator to enter a dollar amount. The computing server 110 receives the administrator's input in the portal 600 and generates selection criteria which the computing server 110 uses to identify real-time transactions as unverified transactions.

Machine Learning Models

The computing server 110 may use machine learning models to identify relevant documentation records in communication payloads. One or more machine learning models may be part of the identification model 270. The computing server 110 may accumulate a large number of past communication payloads, wherein some communication payloads contain documentation records, and some do not. The computing server 110 may use the past communication payloads as a set of training samples to iteratively train one or more machine learning models that can be used to identify documentation records in communication payloads.

The computing server 110 may use machine learning models to match documentation records with transactions. One or more machine learning models may be part of the matching model 245. The computing server 110 may accumulate a large number of past documentation records and corresponding transaction records as well as documentation records and transaction records that do not have corresponding matches. The computing server 110 may use the past documentation records and transaction records as a set of training samples to iteratively train one or more machine learning models that can be used to match documentation record with transactions.

A training sample may include a label for supervised training. The label may be generated by a manual process or by an automatic process. For example, in training a model that is used to identify a documentation record in a communication payload, the training samples may include past communication records with the presence of a documentation record as labels.

In some embodiments, a machine learning model may also be used to identify the useful fields in a communication payload or a documentation record. In such cases, the labels of training samples may be locations of the fields. In some embodiments, certain common communication payloads or documentation records may have rule-based models to help identifying information. For example, for common large merchants such as chain restaurants, online retailing platforms, large payment POS services, the documentation records of those merchants may follow a standard format. A rule-based model may be used to locate the standard fields in those records. In some cases, part of the training samples includes labels while other training samples do not include labels but are grouped with labeled samples through a process such as clustering and word embeddings.

In various embodiments, a wide variety of machine learning techniques may be used. Examples of which include different forms of unsupervised learning, clustering, embeddings such as word embeddings, support vector regression (SVR) model, random forest classifiers, support vector machines (SVMs) such as kernel SVMs, gradient boosting, linear regression, logistic regression, and other forms of regressions. Deep learning techniques such as neural networks, including convolutional neural networks (CNN), recurrent neural networks (RNN), and long short-term memory networks (LSTM), may also be used. Each transaction dataset may be converted to a feature vector that includes different dimensions. By way of example, strings in the transaction data may be converted to word embeddings using known techniques Word2Vec or another technique. The word embeddings can be one or more dimensions of the feature vector. Other data fields may be turned into various dimensions of a feature vector representing a transaction data. The feature vectors can be inputted into the machine learning model to iteratively train the machine learning model. A series of transactions may also be converted to a time series.

In various embodiments, the training techniques for iteratively training a machine learning model may be supervised, semi-supervised, or unsupervised. In supervised training, the machine learning algorithms may be trained with a set of training samples that are labeled. For example, a past communication payload can be associated with a label. The labels for each training sample may be binary or multi-class. In some cases, an unsupervised learning technique may be used. The samples used in training are not labeled. Various unsupervised learning techniques such as clustering may be used. In some cases, the training may be semi-supervised with the training set having a mix of labeled samples and unlabeled samples.

A machine learning model is associated with an objective function, which generates a metric value that describes the objective goal of the training process. For example, the training intends to reduce the error rate of the model in generating predictions of the results (whether the result is the presence of a documentation record within a communication payload or a match between a documentation record and a transaction). In such a case, the objective function may monitor the error rate of the machine learning model. In transaction series analysis, the objective function of the machine learning algorithm may be the value different in predicting the recurring frequency in a training set. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the absolute distance between the predicted value and the actual value), L2 loss (e.g., root mean square distance).

Figure 7:
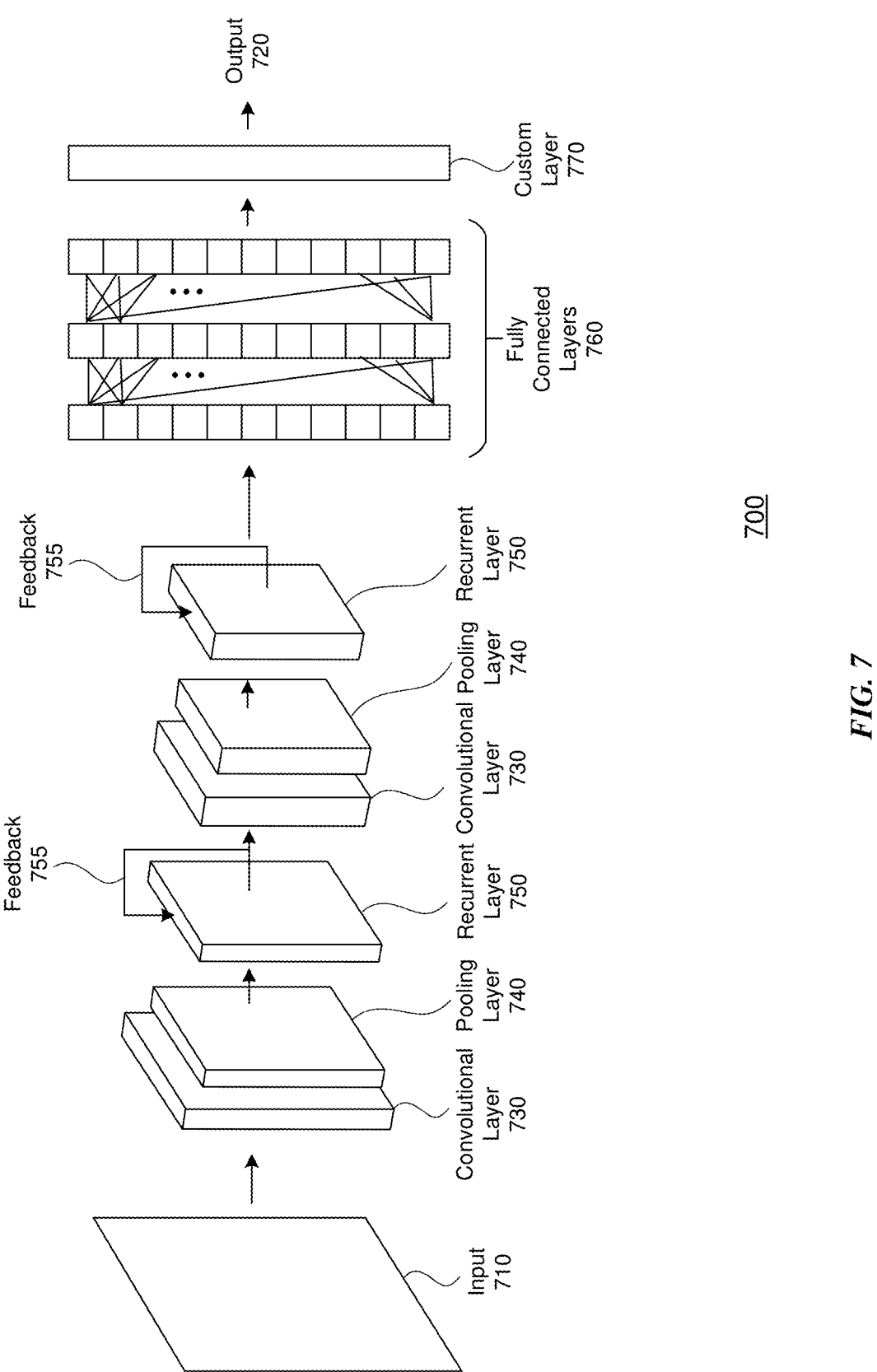
FIG. 7 is a conceptual diagram illustrating a machine learning model, in accordance with some embodiments.

Referring to FIG. 7, a structure of an example neural network (NN) is illustrated, according to an embodiment. While the structure of a neural network is illustrated as an example, the machine learning model may also be another model such as an SVM, a random forest model, or another suitable model. The NN 700 may receive an input 710 and generate an output 720. The NN 700 may include different kinds of layers, such as convolutional layers 730, pooling layers 740, recurrent layers 750, full connected layers 760, and custom layers 770. A convolutional layer 730 convolves the input of the layer with one or more kernels to generate convolved features. Each convolution result may be associated with an activation function. A convolutional layer 730 may be followed by a pooling layer 740 that selects the maximum value (max pooling) or average value (average pooling) from the portion of the input covered by the kernel size. The pooling layer 740 reduces the spatial size of the extracted features. In some embodiments, a pair of convolutional layer 730 and pooling layer 740 may be followed by a recurrent layer 750 that includes one or more feedback loop 755. The recurrent layer 750 may be gated in the case of an LSTM. The recurrent layer 750 may be particularly useful in analyzing series such as a transaction series. The layers 730, 740, and 750 may be followed in multiple fully connected layers 760 that have nodes (represented by squares in FIG. 7) connected to each other. The fully connected layers 760 may be used for classification and object identification. In some embodiments, one or more custom layers 770 may also be presented for the generation of a specific format of output 720.

The order of layers and the number of layers of the NN 700 in FIG. 7 is for example only. In various embodiments, a NN 700 includes one or more convolutional layer 730 but may or may not include any pooling layer 740 or recurrent layer 750. If a pooling layer 740 is present, not all convolutional layers 730 are always followed by a pooling layer 740. A recurrent layer may also be positioned differently at other locations of the NN. For each convolutional layer 730, the sizes of kernels (e.g., 3×3, 5×5, 7×7, etc.) and the numbers of kernels allowed to be learned may be different from other convolutional layers 730. In some embodiments, the NN 700 does not include any convolutional layers.

A machine learning model includes certain layers, nodes, kernels, and/or coefficients. Training of a machine learning model, such as the NN 700, includes iterations of forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g., weights and kernel coefficients) that are adjustable during training. In addition, some of the nodes in a neural network may each also be associated with an activation function that decides the weight of the output of the node in forward propagation. Common activation functions may include step functions, linear functions, sigmoid functions, hyperbolic tangent functions (tanh), and rectified linear unit functions (ReLU). After input is provided into the neural network and passes through a neural network in the forward direction, the results may be compared to the training labels or other values in the training set to determine the neural network's performance. The process of prediction may be repeated for other transactions in the training sets to compute the value of the objective function in a particular training round. In turn, the neural network performs backpropagation by using gradient descent such as stochastic gradient descent (SGD) to adjust the coefficients in various functions to improve the value of the objective function.

Multiple iterations of forward propagation and backpropagation may be performed. Training may be completed when the objective function has become sufficiently stable (e.g., the machine learning model has converged) or after a predetermined number of rounds for a particular set of training samples. Different machine learning models may be trained for different purposes.

Additional Considerations

The general architecture disclosed herein has applications in various areas, such as a payment transaction verification process. For example, in a credit card transaction, the credit card company logs data for the transaction incurred between an end user and a merchant, and the merchant provides a record of the transaction to the end user. This record can be a receipt such as an emailed receipt or a printed receipt. In some embodiments, a computing server verifies the transactions by matching transaction data (e.g., amount of the transaction, date of the transaction, and name of the merchant) provided by the credit card company against the transaction data parsed from a receipt. Instead of prompting the end user to provide the receipt for verification, the computing server can operate on standby until, unprompted, the end user provides the receipt. Thus, the computing server does not expend unnecessary processing and network bandwidth resources to acquire records from end users for verifying transactions.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
    receiving, by a computing server, one or more selection criteria from an organization client, the selection criteria specifying parameters, wherein transactions associated with one or more of the parameters are selected to be verified;

processing transactions on behalf of the organization client, each of the transactions incurred between a third-party named entity and a transaction account associated with the organization client;

identifying one or more of the transactions as unverified transactions based on the unverified transactions being associated with one or more of the parameters specified by the organization client;

establishing, for a secure server, an access privilege of an application used by the organization client, the application being a software application that handles communications that include personally identifiable information of users of the organization client, the secure server having a heightened security standard in handling the personally identifiable information compared to the computing server;

receiving, from the secure server, communication payloads stored in the application, the communication payloads retrieved by the secure server under the access privilege of the application, the communication payloads each including a respective documentation record that is automatically generated by a particular third-party named entity acknowledging an occurrence of a respective particular transaction;

for each respective documentation record:

extracting attributes from the respective documentation record; and matching the respective particular transaction documented by the documentation record to one of the unverified transactions, wherein the matching comprises scoring the attributes extracted from the documentation record against metadata of the one of the unverified transactions; and causing a graphical user interface that allows the organization client to manage the transactions to display an indication of which of the unverified transactions is successfully matched.

2. The computer-implemented method of claim 1, wherein scoring the attributes extracted from the documentation record against metadata of the one of the unverified transactions comprises:

assigning weights to the attributes that match the metadata of the one of the unverified transactions; and summing weighted attributes to generate a score.

3. The computer implemented method of claim 2, wherein matching the respective particular transaction documented by the documentation record to one of the unverified transactions comprises:

comparing the sum of the weighted attributes to a threshold score; and responsive to the sum exceeding the threshold score, determining that the particular transaction is a match to the one of the unverified transactions.

4. The computer implemented method of claim 2, wherein one of the attributes that matches the metadata of the one of the unverified transactions is an exact match.

5. The computer implemented method of claim 1, wherein scoring the attributes extracted from the documentation record comprises inputting the attributes extracted from the documentation record to a machine learning model for the machine learning model to generate a score.

6. The computer-implemented method of claim 1, wherein extracting the attributes from the respective documentation record comprises using a text search method.

7. The computer-implemented method of claim 1, wherein extracting the attributes from the respective documentation record comprises using natural language processing to analyze content of the documentation record.

8. The computer-implemented method of claim 1, wherein matching the respective particular transaction documented by the documentation record to one of the unverified transactions comprises identifying candidate unverified transactions within a time window that correspond to a timing record included in the documentation record.

9. The computer-implemented method of claim 1, wherein the attributes include "To," "From," or "Subject" fields of an email.

10. The computer-implemented method of claim 1, wherein the attributes include body, hidden text, attachments, or timing data of an email.

11. The computer-implemented method of claim 1, wherein the documentation record is an electronic receipt automatically sent from the particular third-party named entity in response to the occurrence of the particular transaction.

12. The computer-implemented method of claim 11, wherein identifying the one or more of the transactions as unverified transactions comprises:

identifying a message header in the electronic receipt;

determining, using the message header, that the electronic receipt was transmitted from an automated system associated with the particular third-party named entity to an electronic address of an end user; and identifying a set of candidate transactions incurred between a plurality of third-party named entities and the transaction account associated with the electronic address, wherein the set of candidate transactions include the unverified transaction.

13. The computer-implemented method of claim 1, further comprising:

causing the graphical user interface to display one or more user input fields configured to receive manual verification from the organization client that the transaction matches the documentation record.

14. A non-transitory computer-readable storage medium configured to store computer code comprising instructions, wherein the instructions, when executed by one or more processors, cause the one or more processors to:

receive, by a computing server, one or more selection criteria from an organization client, the selection criteria specifying parameters, wherein transactions associated with one or more of the parameters are selected to be verified;

process transactions on behalf of the organization client, each of the transactions incurred between a third-party named entity and a transaction account associated with the organization client;

identify one or more of the transactions as unverified transactions based on the unverified transactions being associated with one or more of the parameters specified by the organization client;

establish, for a secure server, an access privilege of an application used by the organization client, the application being a software application that handles communications that include personally identifiable information of users of the organization client, the secure server having a heightened security standard in handling the personally identifiable information compared to the computing server;

receive, from the secure server, communication payloads stored in the application, the communication payloads retrieved by the secure server under the access privilege
of the application, the communication payloads each
including a respective documentation record that is
automatically generated by a particular third-party
named entity acknowledging an occurrence of a respective particular transaction;
for each respective documentation record:
    extract attributes from the respective documentation
        record; and
    match the respective particular transaction documented
by the documentation record to one of the unverified
        transactions, wherein the matching comprises scor-
        ing the attributes extracted from the documentation
        record against metadata of the one of the unverified
transactions; and
cause a graphical user interface that allows the organiza-
    tion client to manage the transactions to display an
    indication of which of the unverified transactions is
    successfully matched.
15. The non-transitory computer-readable storage
medium of claim 14, wherein extracting the attributes from
the respective documentation record comprises using a text
search method.
    16. The non-transitory computer-readable storage
medium of claim 14, wherein matching the respective par-
ticular transaction documented by the documentation record
to one of the unverified transactions comprises identifying
candidate unverified transactions within a time window that
correspond to a timing record included in the documentation
record.
    17. The non-transitory computer-readable storage
medium of claim 14, wherein the attributes include "To,"
"From," or "Subject" fields of an email.
    18. The non-transitory computer-readable storage medium of claim 14, wherein the attributes include body,
hidden text, attachments, or timing data of an email.
    19. The non-transitory computer-readable storage
medium of claim 14, wherein the documentation record is an
electronic receipt automatically sent from the particular
third-party named entity in response to the occurrence of the
particular transaction.
    20. A system, comprising:
    a computing server comprising one or more processors
        and memory, the memory configured to store instructions, wherein the instructions, when executed by the
one or more processors, cause the one or more proces-
sors to:
receive, by a computing server, one or more selection
    criteria from an organization client, the selection
    criteria specifying parameters, wherein transactions
    associated with one or more of the parameters are
    selected to be verified;
process transactions on behalf of the organization cli-
    ent, each of the transactions incurred between a
    third-party named entity and a transaction account
    associated with the organization client;
identify one or more of the transactions as unverified
    transactions based on the unverified transactions
    being associated with one or more of the parameters
    specified by the organization client;
establish, for a secure server, an access privilege of an
    application used by the organization client, the appli-
    cation being a software application that handles
    communications that include personally identifiable
    information of users of the organization client, the
    secure server having a heightened security standard
    in handling the personally identifiable information
    compared to the computing server;
receive, from the secure server, communication pay-
    loads stored in the application, the communication
    payloads retrieved by the secure server under the
    access privilege of the application, the communica-
    tion payloads each including a respective documen-
    tation record that is automatically generated by a
    particular third-party named entity acknowledging
    an occurrence of a respective particular transaction;
for each respective documentation record:
extract attributes from the respective documentation
    record; and
match the respective particular transaction documented
    by the documentation record to one of the unverified
    transactions, wherein the matching comprises scor-
    ing the attributes extracted from the documentation
    record against metadata of the one of the unverified
    transactions; and
cause a graphical user interface that allows the orga-
    nization client to manage the transactions to display
    an indication of which of the unverified transactions
    is successfully matched.

* * * * *